(12) United States Patent
Xiong

(10) Patent No.: US 12,053,124 B2
(45) Date of Patent: Aug. 6, 2024

(54) MILK BEVERAGE HEATING MIXER

(71) Applicant: Xingjian Xiong, Shenzhen (CN)

(72) Inventor: Xingjian Xiong, Shenzhen (CN)

( * ) Notice: Subject to any disclaimer, the term of this patent is extended or adjusted under 35 U.S.C. 154(b) by 725 days.

(21) Appl. No.: 17/413,201

(22) PCT Filed: Dec. 12, 2019

(86) PCT No.: PCT/CN2019/124878
§ 371 (c)(1),
(2) Date: Jun. 11, 2021

(87) PCT Pub. No.: WO2020/119764
PCT Pub. Date: Jun. 18, 2020

(65) Prior Publication Data
US 2022/0039602 A1    Feb. 10, 2022

(30) Foreign Application Priority Data

Dec. 13, 2018 (CN) .......................... 201811526511.1

(51) Int. Cl.
*A47J 43/07* (2006.01)
*A47J 31/44* (2006.01)
*A47J 31/52* (2006.01)
*A47J 43/046* (2006.01)
*A47J 43/08* (2006.01)

(52) U.S. Cl.
CPC ....... *A47J 43/0766* (2013.01); *A47J 31/4403* (2013.01); *A47J 31/4439* (2013.01); *A47J 31/5253* (2018.08); *A47J 43/0465* (2013.01); *A47J 43/0716* (2013.01); *A47J 43/085* (2013.01); *A47J 31/441* (2013.01); *A47J 31/4435* (2013.01)

(58) Field of Classification Search
CPC ................ A47J 43/0465; A47J 43/0716; A47J 43/0766; A47J 31/5253; A47J 31/441; A47J 31/4432
USPC .......................................................... 99/348
See application file for complete search history.

(56) References Cited

U.S. PATENT DOCUMENTS

| | | | |
|---|---|---|---|
| 2007/0034084 A1* | 2/2007 | Shertok | A47J 31/52 99/279 |
| 2016/0030900 A1* | 2/2016 | Jin | A47J 31/00 261/84 |
| 2019/0328167 A1* | 10/2019 | Abdo | A47J 27/004 |

FOREIGN PATENT DOCUMENTS

WO    WO-2019101765 A1 *  5/2019    ............ A47J 27/004

* cited by examiner

*Primary Examiner* — Reginald Alexander
(74) *Attorney, Agent, or Firm* — Novoclaims Patent Services LLC; Mei Lin Wong

(57) ABSTRACT

A milk beverage heating mixer comprises a cup, a stirrer, a base, a heating plate, a temperature measurement assembly and a first lever assembly. A cavity for accommodating the cup is formed in an upper end of the base. A first radial opening and a second radial opening are formed in a cavity wall of the cavity. The heating plate is disposed at the bottom of the cavity. The first lever assembly is rotatably disposed outside the cavity, and a protrusion at a first end of the first lever assembly stretches into the cavity via the first radial opening. When accommodated in the cavity, the cup presses the protrusion and pushes the temperature measurement assembly by means of the second end of the first lever assembly to stretch into the cavity via the second radial opening to make contact with a side wall of the cup.

24 Claims, 13 Drawing Sheets

MILK BEVERAGE HEATING MIXER

CROSS REFERENCE OF RELATED APPLICATION

This is a national phase national application of an international patent application number PCT/CN2019/124878 with a filing date of Dec. 12, 2019, which claimed priority of a foreign application number CN201811526511.1 with a filing date of Dec. 13, 2018 in China. The contents of these specifications, including any intervening amendments thereto, are incorporated herein by reference.

BACKGROUND OF THE PRESENT INVENTION

Field of Invention

The application relates to the technical field of liquid food processing equipment, such as a milk beverage heating mixer.

Description of Related Arts

Milk beverage heating mixers have been widely used both at home and commercially and generally refer to appliances for heating, stirring and foaming milk, and milk foam machines and milk tea machines are common milk beverage heating mixers.

The milk foam machines in related arts on the present market typically have three functions: making normal-temperature milk foam, making hot milk foam and heating milk. After being processed, the milk and milk foam are added into coffee in different proportions to prepare different fancy coffees such as cappuccino and latte; or, chocolate is added into milk when the milk is heated to prepare milk chocolate hot drinks to meet different taste requirements of users.

In the heating process of the milk beverage heating mixer, the temperature of milk in a cup of the milk beverage heating mixer needs to be measured with a temperature control device to ensure that the milk is controlled at a proper preset foaming temperature (generally 60-70° C.) to maintain a sufficient milk foaming volume and a good taste. In related arts, a through hole is generally formed in a heating plate, and the temperature control device penetrates through the through hole to make contact with the bottom of the cup to measure the temperature of the milk. For example, Chinese Invention Patent Authorization Publication No. CN101485541B discloses a liquid food heating, stirring and foaming cup which is provided with a cup capable of being separated from a hot plate in a heating base. As shown in FIG. 2 in Page 6 of the invention document, the hot plate has three through holes penetrating through the hot plate in the thickness direction, namely a hole used for mounting a retaining ring and formed in the center of the hot plate, a through hole for mounting a thermostat, and a through hole for starting a handspike of a micro switch; and the bottom of the cup makes contact with the thermostat to measure the temperature and start the handspike of the micro switch.

Such a temperature measurement method has the following defects: the thermostat penetrates through the hot plate and is affected by the temperature of the hot plate to a great extent, so the temperature measurement accuracy is affected; moreover, the through holes formed in the hot plate reduce the heating efficiency; especially when milk is continuously heated multiple times or hot milk foam is made continuously, the hot plate will be always at a high temperature, and the initial temperature of the hot plate is too high, the temperature measurement accuracy of the thermostat will become much poorer, and the temperature of hot milk or hot milk foam will become lower gradually; with the decrease of the stirring time, the milk cannot be stirred or foamed sufficiently, which results in a poor milk foaming effect; because the actual temperature of the hot milk or hot milk foam is relatively low and fails to reach the proper preset foaming temperature, the foaming volume is small, and the taste is affected; it will not return to normal until the temperature of the hot plate is decreased to the normal temperature, so user experience is affected; and the through holes in the hot plate may cause potential safety hazards.

The technical solution for measuring the temperature of milk by means of an infrared induction device has been put forward in related arts. For example, Chinese Utility Model Patent Authorization Publication No. CN203483288U discloses a milk foamer which comprises a base and a milk foaming cup disposed on the base, wherein a rotatable driving magnetic head is disposed in the base, a stirring device is disposed in the milk foaming cup and comprises a stirring head internally provided with a magnet, the driving magnetic head is vertically aligned with the stirring head, the base is also provided with an infrared induction device and a recess for accommodating the milk foaming cup, the infrared induction device is disposed on the side wall of the recess or on the bottom surface of the recess and is used to sense the existence of the cup to control the foamer to operate or stop and to sense and control the temperature of milk.

The infrared induction device for sensing the existence of the cup on the heating plate functions like a micro switch to control the foamer to operate or stop and is also used to sense and control the temperature of milk. But, such a temperature measurement method is relatively high in cost and may be disturbed and affected by waste heat of the heating plate; and particularly, when the milk foamer is used for continuously heating milk for multiple cycles, the temperature measurement accuracy and sensitivity of the infrared induction device will be reduced, which leads to an unsatisfying temperature measurement effect.

SUMMARY OF THE PRESENT INVENTION

The application provides a milk beverage heating mixer capable of improving the temperature measurement accuracy of a cup when used for heating multiple cups of milk continuously.

The application adopts the following technical solution:
A milk beverage heating mixer comprises:
A cup for containing a milk beverage;
A base having an upper end formed with a cavity for accommodating the cup, wherein a first radial opening and a second radial opening are formed in a cavity wall of the cavity;
A heating plate disposed at the bottom of the cavity and is configured to heat the bottom of the cup;
A temperature measurement assembly; and
A first lever assembly rotatably disposed outside the cavity, wherein a protrusion at a first end of the first lever assembly stretches into the cavity via the first radial opening; and when accommodated in the cavity, the cup presses the protrusion and pushes the temperature measurement assembly by means of a second end of the first lever assembly to stretch into the cavity via the second radial opening to make contact with a side wall of the cup.

REFERENCE SIGNS 100, cup; 200, base;
110, stirrer; 120, handle; 130, stirring shaft; 140, cup lid; 150, heat-conducting plate; 160, isolation hood; 111, driven magnet; 161, lifting lever;
210, heating plate; 220, temperature measurement assembly; 230, electronic control board; 240, micro switch; 250, cavity; 260, support ring; 270, first lever assembly; 2101, central blind hole; 2102, concentric fine grain; 2301, key electronic board; 2302, key switch;
221, mounting base; 222, thermostat; 2221, temperature sensing sleeve; 2222, NTC thermistor; 2211, mounting hole; 2212, outer cylinder; 2223, temperature sensing surface; 2224, positioning block;
251, heat-insulation ring; 253, first radial opening; 254, second radial opening; 255, magnetic driving part; 256, first bump; 257, first groove; 258, third radial opening; 2511, cavity wall; 2512, flange edge; 2513, upper hole; 2514, lower hole;
261, support wall; 262, support base plate; 263, support block; 264, driving device; 265, magnetic driving disk; 2651, driving magnet;
271, first end; 272, second end; 273, protrusion; 274, lever spindle; 275, magnetic driven part; 276, second groove; 277, start plate; 278, lever through hole; 279, connecting portion; 2721, first guide through hole; 2722, strip hole; 2723, connecting hole; 2731, press surface;
281, first elastic element; 282, first guide pillar; 283, first stop; 284, connecting plate; 285, second guide pillar; 286, second stop; 287, third guide pillar; 288, third stop; 289, connecting pillar; 2810, connecting piece; 2841, second guide through hole; 2842, third guide through hole; 291, first elastic return element; 292, second lever assembly; 293, press lever.

DETAILED DESCRIPTION OF THE PREFERRED EMBODIMENT

The technical solution of the application will be further described below in conjunction with the accompanying drawings and specific embodiments.

It should be understood that the terms such as "upper", "lower", "front", "back", "left", "right", "vertical", "horizontal", "top", "bottom", "inner" and "outer" in the description of the application are used to indicate directional or positional relations based on the drawings merely for the purpose of facilitating and simplifying the description of the present application, do not indicate or imply that a device or element referred to must have a specific direction or be configured and operated in a specific direction, and thus should not be construed as limiting the present application.

Embodiment 1

Figure 1:
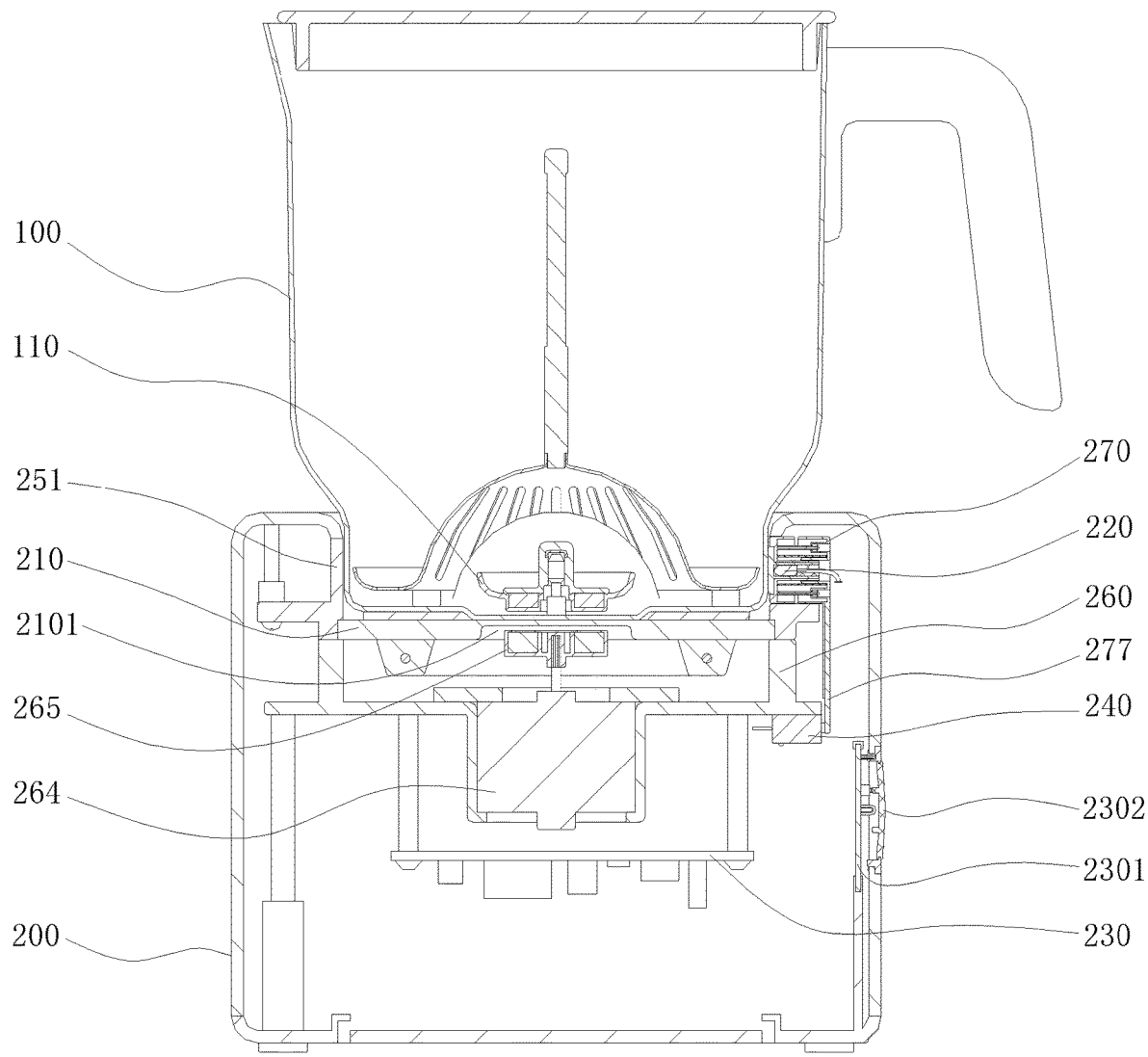
FIG. 1 is a sectional view of a milk beverage heating mixer in Embodiment 1 of the present invention.
Figure 2:
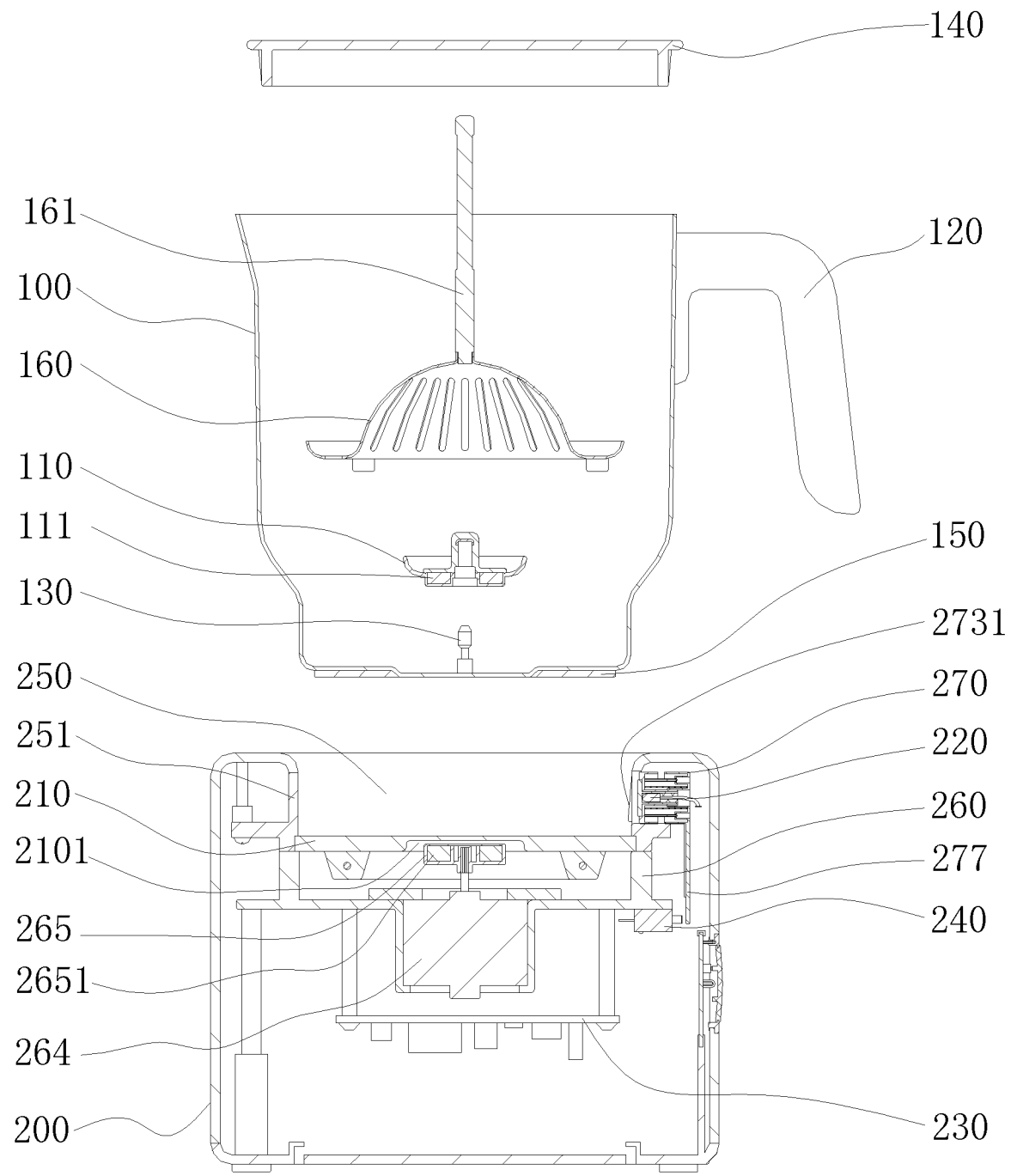
FIG. 2 is an exploded view of the milk beverage heating mixer in Embodiment 1 of the present invention.

As shown in FIG. 1 and FIG. 2, this embodiment provides a milk beverage heating mixer comprising a cup 100, a stirrer 110, an isolation hood 160 and a base 200, wherein a heating plate 210, a heat-insulation ring 251, a support ring 260, a driving device 264, a magnetic driving disk 265 fixedly connected to an output shaft of the driving device 264, a temperature measurement assembly 220, a first lever assembly 270, an electronic control board 230, a key electronic board 2301 and a micro switch 240 are disposed in the base 200; wherein, the cup 100 is used for containing a milk beverage and is separable from the base 200, a cavity 250 for accommodating the cup 100 is formed in the upper end of the base 200, the heating plate 210 is disposed at the bottom of the cavity 250 to heat the bottom of the cup 100, the temperature measurement assembly 220 makes contact with the side wall of the cup 100 for temperature measurement, the stirrer 110 is used for stirring the milk beverage in the cup 100, the driving device 264 may be a motor, a driving magnet 2651 is disposed in the magnetic driving disk 265, a driven magnet 111 to be magnetically attracted by the driving magnet 2651 is disposed in the stirrer 110, the driving magnet 2651 and the driven magnet 111 may be neodymium-iron-boron magnets, and when rotating along with the driving device 264, the magnetic driving disk 265 magnetically drives the stirrer 110 to rotate to stir the milk beverage in the cup 100 to make milk foam; and the heating plate 210, the driving device 264, the temperature measurement assembly 220, the micro switch 240 and the key electronic board 2301 are all electrically connected to the electronic control board 230.

In some embodiments, the temperature measurement assembly 220 is configured to measure the temperature of the cup 100 when making contact with the side wall of the cup 100.

As shown in FIG. 1 and FIG. 2, the cup 100 may be provided with a handle 120, a cup lid 140 is disposed at an opening in the upper end of the cup 100, a stirring shaft 130 is disposed at the center of the inner bottom surface of the cup 100, and the stirrer 110 is disposed around the stirring shaft 130 and is able to rotate around the stirring shaft 130. In this specific embodiment, the stirring shaft 130 is fixed to the inner bottom surface of the cup 100 by welding or riveting, and the stirrer 110 is detachably disposed around the stirring shaft 130. In other embodiments, the stirring shaft 130 may be vertically riveted and fixed to a base plate to form a support, a lifting element may be disposed on the outer side of the base plate, the base plate of the support is separably disposed in a recess in the center of the inner bottom surface of the cup 100, and the stirrer 110 is rotatably disposed around the stirring shaft 130. Wherein, the top surface of an inner hole of the stirrer 100 is in point contact with and supported by the top end of the stirring shaft 130, so that the friction is reduced when the stirrer 110 rotates. In this embodiment, the cup 100 may be formed by stretching a stainless steel plate, and a heat-conducting plate 150 is fixed to the outer bottom surface of the cup 100 by soldering or in other manners and is made of aluminum or other heat-conducting materials. It should be noted that in other embodiments where the cup 100 is made of an aluminum plate or is formed by stretching other heat-conducting materials, the heat-conducting plate does not need to be disposed at the bottom surface of the cup 100 anymore. In other embodiments where the cup 100 is a glass cup, the heat-conducting plate is connected to the bottom of the cup 100.

Figure 3:
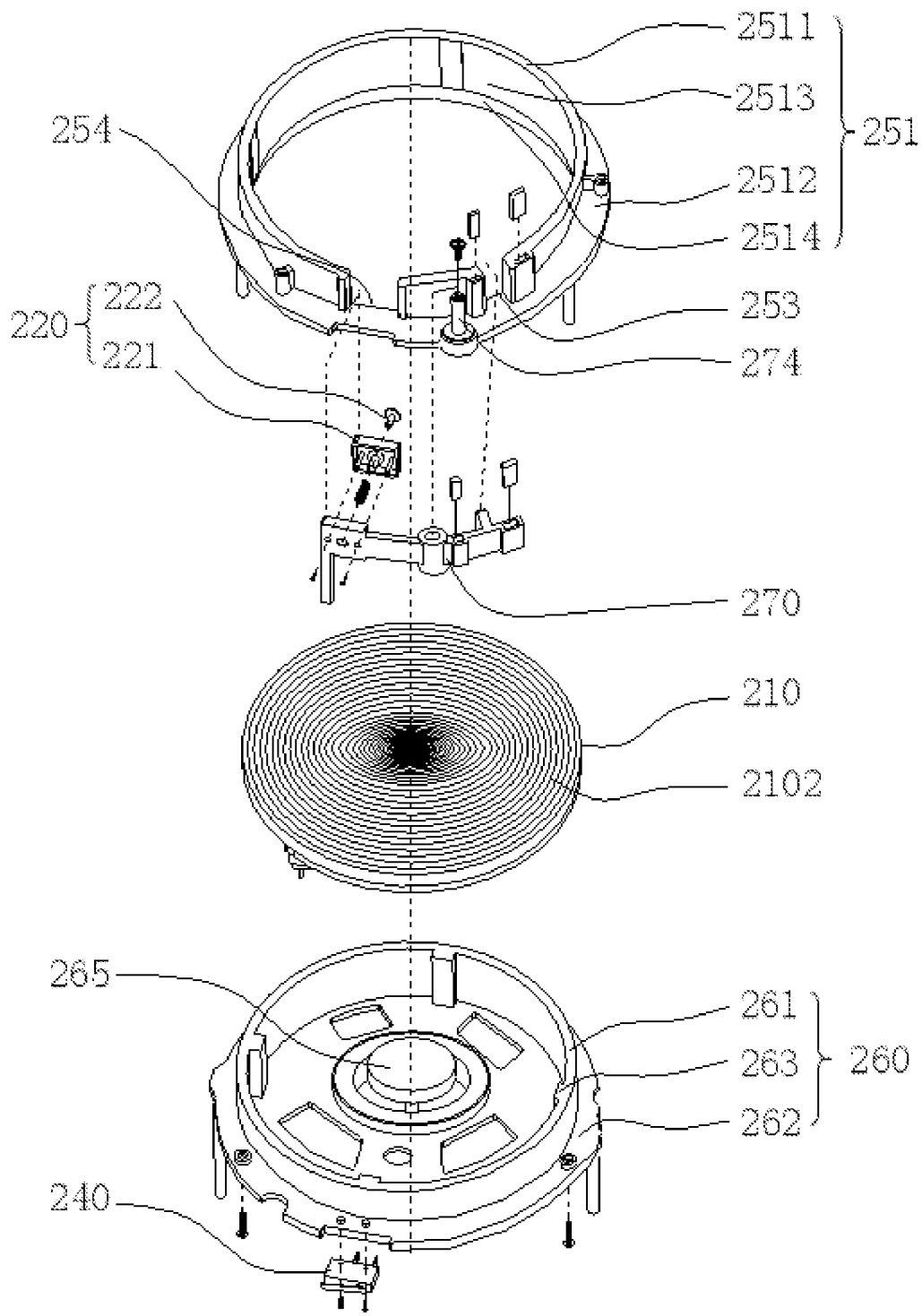
FIG. 3 is a first exploded view of part of structural members in a base in Embodiment 1 of the present invention.

As shown in FIG. 1 to FIG. 3, a central blind hole 2101 is formed in the center of the lower end face of the heating plate 210 and is used to decrease the magnetic driving distance between the magnetic driving disk 265 and the stirrer 110. By increasing the magnetic attraction between the driving magnet 2651 and the driven magnet 111 and adopting the point contact and support for reducing the friction between the inner hole of the stirrer 110 and the top end of the stirring shaft 130 and the lightweight design of the stirrer 110, it is ensured that the magnetic driving disk 265 can magnetically drive the stirrer 110 to rotate for stirring reliably, and the defect of forming a through hole in the center of the heating plate in related arts is overcome; and a plurality of concentric fine grains 2102 are disposed on a heating surface of the heating plate 210 to improve the heating efficiency of the heating plate 210 to the bottom of the cup 100.

The isolation hood 160 is movably disposed on the inner bottom surface of the cup 100, is approximately hemispherical or conical or in other shapes, covers the periphery of the stirrer 110 and is spaced apart from the stirrer 110, a plurality of through grooves and/or through holes are formed in the isolation hood 160, the maximum outer diameter of the isolation hood 160 is smaller than the inner diameter of the lower end of the cup 100, and when chocolate bars or other blocky seasonings are added into the cup 100, the isolation hood 160 is used to prevent the chocolate bars or other blocky seasonings from making contact with the magnetic stirrer 110, so that the rotation and stirring of the stirrer 110 will not be hindered by the blocky seasonings. A lifting lever 161 is disposed on the isolation hood 160, so that the isolation hood 160 can be easily taken or placed by means of the lifting lever 161; and the lifting lever 161 is detachably connected to the isolation hood 160 through a thread or an elastic buckle, or is fixedly connected to or integrated with the isolation hood 160 by welding. It can be understood that the isolation hood 160 can be omitted in other embodiments. For example, when the mixer is merely used for heating milk or making milk foam, the isolation hood 160 is not needed. Wherein, the isolation hood 160 may be formed by stretching a stainless steel plate or be made of food-grade plastic materials.

As shown in FIG. 1 to FIG. 3, the support ring 260 comprises a support wall 261, support blocks 263 and a support base plate 262, wherein the support blocks 263 are disposed on the inner side of the support wall 261. The driving device 264 is fixed to the center of the support ring 260 and is vertically coaxial with the stirrer 110, and the micro switch 240 is connected to the support ring 260. The heat-insulation ring 251 and the support ring 260 may be made of PPS (polyphenylene sulfide) or other high-temperature insulation materials.

Figure 4:
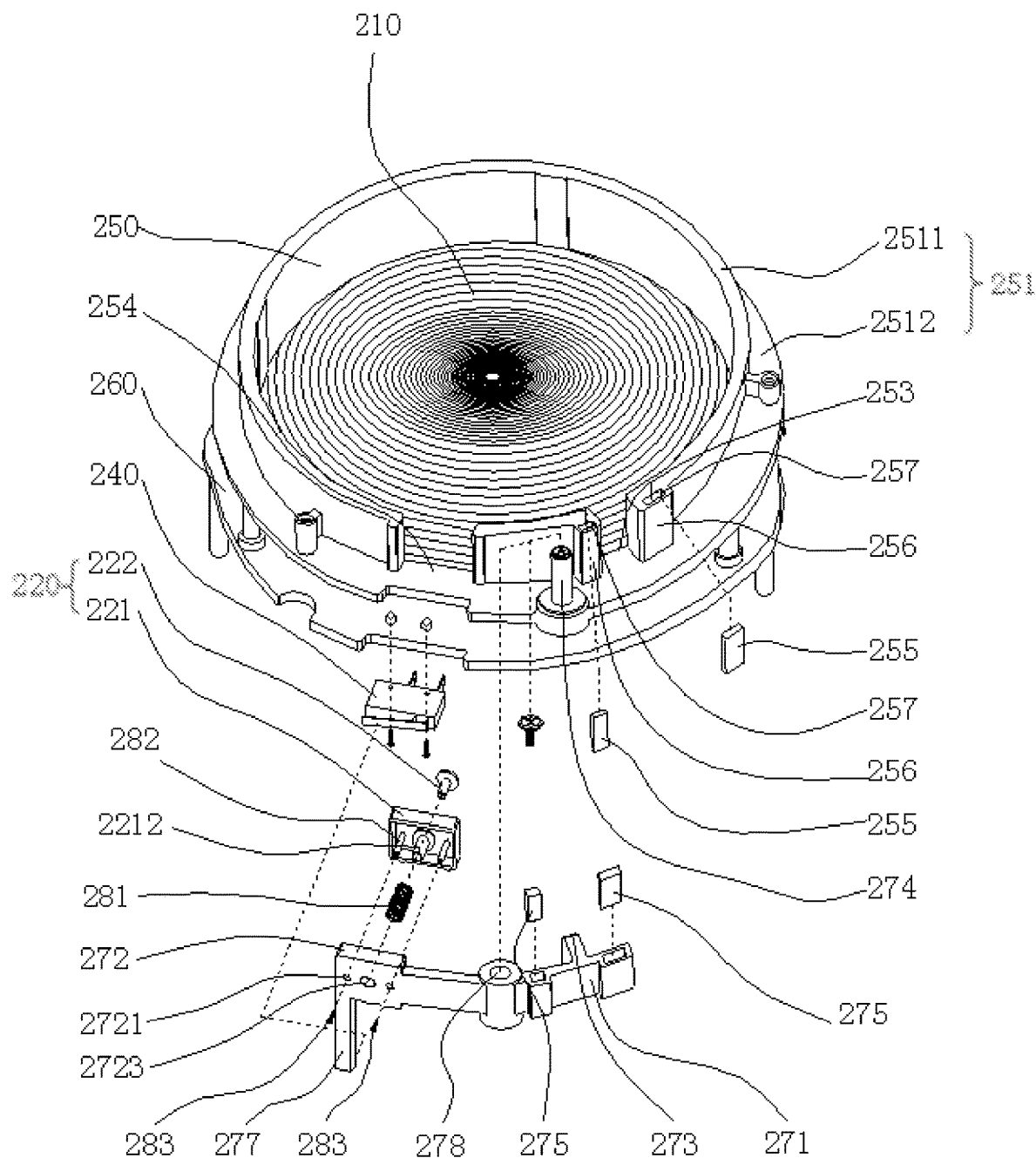
FIG. 4 is a second exploded view of part of structural members in the base in Embodiment 1 of the present invention.

As shown in FIG. 1 to FIG. 4, the heat-insulation ring 251 comprises an annular cavity wall 2511 and a flange edge 2512 extending out from the lower periphery of the cavity wall 2511 in the radial direction, wherein the inner side of the cavity wall 2511 and the heating surface, provided with the concentric fine grains 2102, of the heating plate 210 form the cavity 250, the heat-insulation ring 251 is formed with an upper hole 2513 and a lower hole 2514, the diameter of the upper hole 2513 is smaller than that of the lower hole 2514, the outer diameter of the heating plate 210 is greater than the diameter of the upper hole 2513 and is slightly smaller than or equal to the diameter of the lower hole 2514, the thickness of the heating plate 210 is equal to or slightly smaller than the height of the lower hole 2514, the heating plate 210 is disposed in the lower hole 2514 in a sleeved manner and is supported by the support ring 260, and heat-insulation ring 251 and the support ring 260 are fastened and connected together to fix the heating plate 210 and are fixedly connected to the inner wall of the base 200. As shown in FIG. 3 and FIG. 4, a first radial opening 253 and a second radial opening 254 are formed in the cavity wall 2511, a lever spindle 274 is fixedly disposed between the first radial opening 253 and the second radial opening 254 and is located on the flange edge 2512, first bumps 256 are disposed on two sides of the first radial opening 253, and first grooves 257 are formed in the first bumps 256, magnetic driving parts 255 of a return assembly fixed with temperature-resistant glue are disposed in the first grooves 257 and are magnets, magnetic metal sheets or other magnetic elements. It can be understood that the first radial opening 253 and the second radial opening 254 may be in any shapes as long as corresponding components can penetrate through the first radial opening 253 or the second radial opening 254 to stretch into the cavity 250. For example, the first radial opening 253 and the second radial opening 254 may be through holes penetrating through the cavity wall 2511, open through grooves penetrating through the upper end face of the cavity wall 2511, or in other shapes.

In some embodiments, as shown in FIG. 3 and FIG. 4, the first radial opening 253 is an opening penetrating through the cavity wall 2511 in the radial direction of the cavity wall 2511, and the second radial opening 254 is an opening penetrating through the cavity wall 2511 in the radial direction of the cavity wall 2511.

Figure 8:
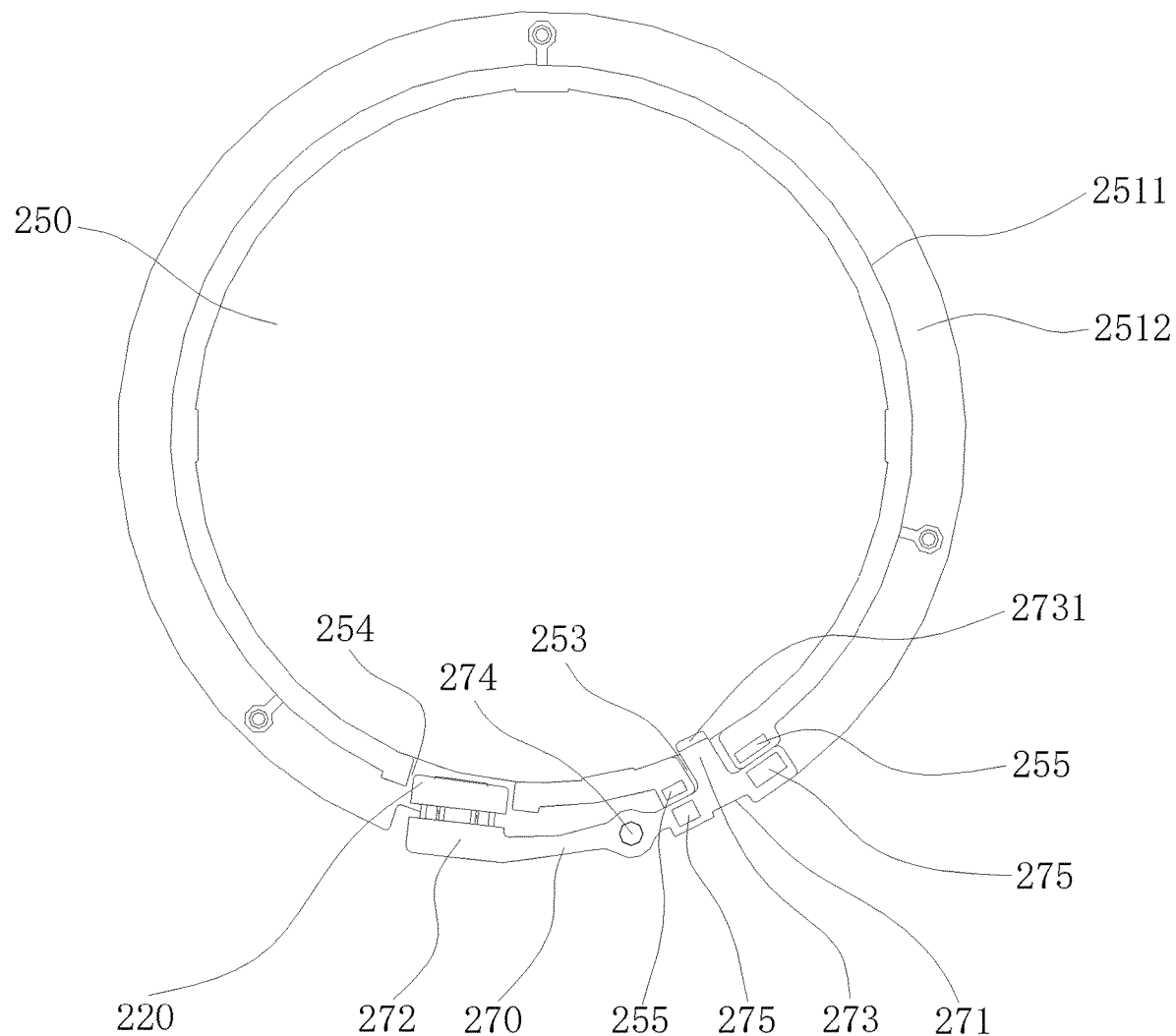
FIG. 8 is a top view of the milk beverage heating mixer with a cup being removed from a cavity in Embodiment 1 of the present invention.

As shown in FIG. 8, in some embodiments, the magnetic driving parts 255 are disposed on the cavity wall 2511 and are located at the first radial opening 253.

As shown in FIG. 3 to FIG. 9, in some embodiments, the first lever assembly 270 comprises a first end, 271, a second end 272 and a connecting portion 279, wherein a lever through hole 278 is formed in the connecting portion 279, the lever spindle 274 is rotatably connected into the lever through hole 278, the first end 271 is provided with a protrusion 273 and second grooves 276, magnetic driven parts 275 of the return assembly fixed with temperature-resistant glue are disposed in the second grooves 276, and the second end 272 is provided with first guide through holes 2721 and a connecting hole 2723 and extends downwards to form a start plate 277 for starting the micro switch 240; wherein, a press surface 2731 at the front end of the protrusion 273 stretches into the edge of the cavity 250 by about 2-5 mm via the first radial opening 253, the press surface 2731 is designed as a first guide slope, and the upper end of the first guide slope inclines outwards with respect to the lower end of the first guide slope. By designing the press surface 2731 of the protrusion 273 as the first guide slope, when the guide slope can push the first lever assembly 270 to rotate under the effect of an outward horizontal component when pressed by the cup 100, and then the temperature measurement assembly 220 is pushed to makes contact with the side face of the cup 100 to measure the temperature of the cup 100; the magnetic driven parts 275 are magnets, and the magnetic driven parts 275 and the magnetic driving parts 255 can be magnetically attracted to enable the first lever assembly 270 to return; and the first lever assembly 270 is made of PPS (polyphenylene sulfide) or other high-temperature insulation materials.

Figure 5:
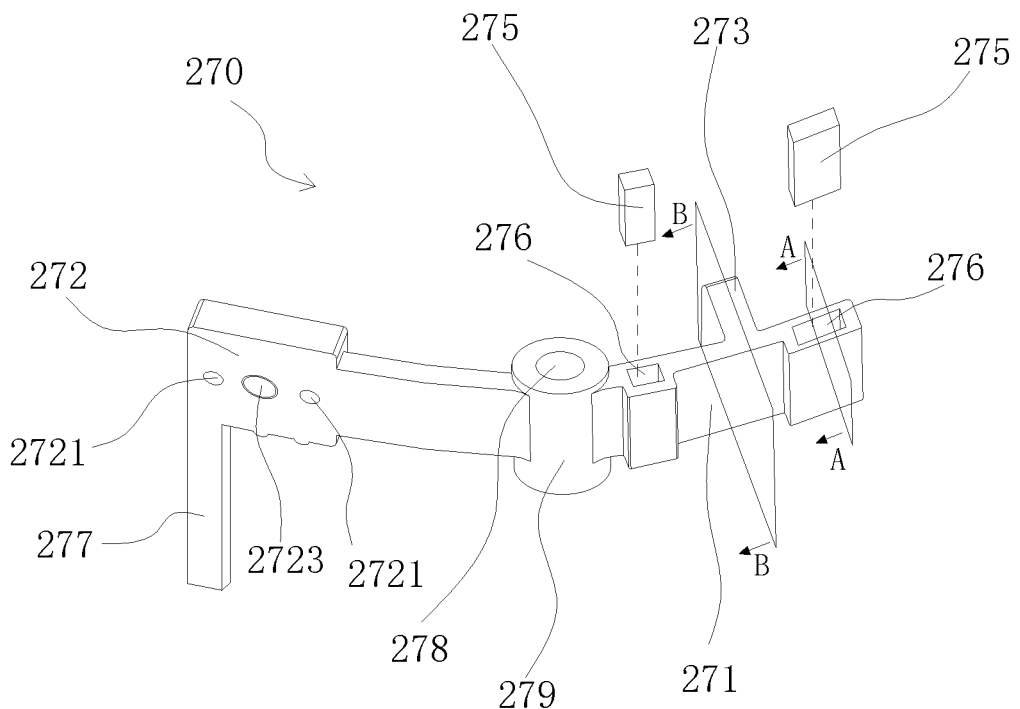
FIG. 5 is a structural view of a first lever assembly in Embodiment 1 of the present invention.
Figure 6:
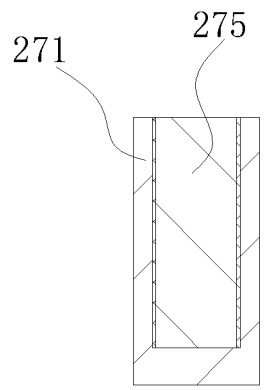
FIG. 6 is a sectional view along A-A in FIG. 5.
Figure 7:
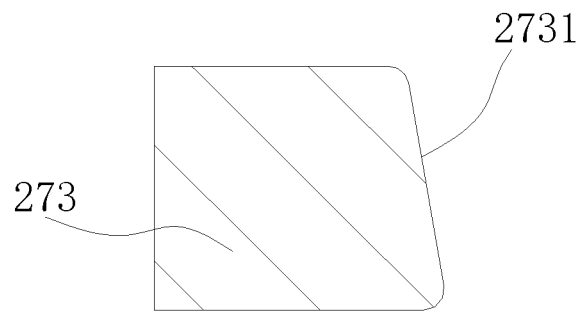
FIG. 7 is a sectional view along B-B in FIG. 5.

In some embodiments, as shown in FIG. 5, the connecting portion 279 of the first lever assembly 270 is located between the first end 271 and the second end 272.

As shown in FIG. 3, FIG. 4, FIG. 10 and FIG. 13, the temperature measurement assembly 220 comprises a mounting base 221 and a thermostat 222, wherein the thermostat 222 is provided with a positioning block 2224, is disposed in a mounting hole 2211 of the mounting base 221 in a sleeved manner and is positioned and oriented by the positioning block 2224, and the thermostat 222 is fixed in the mounting hole 2211 of the mounting base 221 with temperature-resistant glue or in other manners, for example, the thermostat 222 is fixed in the mounting hole 2211 in an interference fit manner or is fixedly connected into the mounting hole 2211 through a buckle. The thermostat 222 comprises a temperature sensing sleeve 2221 and an NTC (Negative Temperature Coefficient) thermistor 2222 disposed in the temperature sensing sleeve 2221 in a sleeved manner, wherein the NTC thermistor 2222 is fixed in the temperature sensing sleeve 2221 with temperature-resistant glue, the temperature sensing sleeve 2221 may be an aluminum sleeve, and a temperature sensing surface 2223 at the front end of the temperature sensing sleeve 2221 is an arc surface matched in radian with the outer surface of the lower end of the cup 100 to better fit the cup 100 for temperature measurement. The mounting base 221 is made of PPS or other high-temperature materials.

Referring to FIG. 3 to FIG. 5 and FIG. 10 to FIG. 13, the temperature measurement assembly 220 is connected to the second end 272 in the following manner: first guide pillars 282 on the mounting base 221 are guided and connected into the first guide through holes 2721 in the second end 272, an outer cylinder 2212 on the mounting base 221 penetrates through the connecting hole 2723 in the second end 272, a first elastic element 281 is disposed around the outer cylinder 2212 and has two ends respectively abutting against the mounting base 221 and the second end 272, first stops 283 are connected to inner holes in end faces of the first guide pillars 282 to connect the temperature measurement assembly 220 to the second end 272, and the temperature measurement assembly 220 is able to linearly reciprocate with respect to the second end 272; wherein, the first elastic element 281 may be a compression spring or a temperature-resistant elastic silica gel element such as a temperature-resistant elastic silica gel sleeve, and the first elastic element 281 can also be made of other elastic materials; the first elastic element 281 has a proper elastic pressing effect, such that the temperature sensing surface 2223 of the thermostat 222 can be better elastically pressed and attached to the side wall of the cup 100 to measure the temperature of the cup 100. The first stops 283 are screws.

In some embodiments, as shown in FIG. 4, the first elastic element 281 is connected between the temperature measurement assembly 220 and the second end 272.

Figure 11:
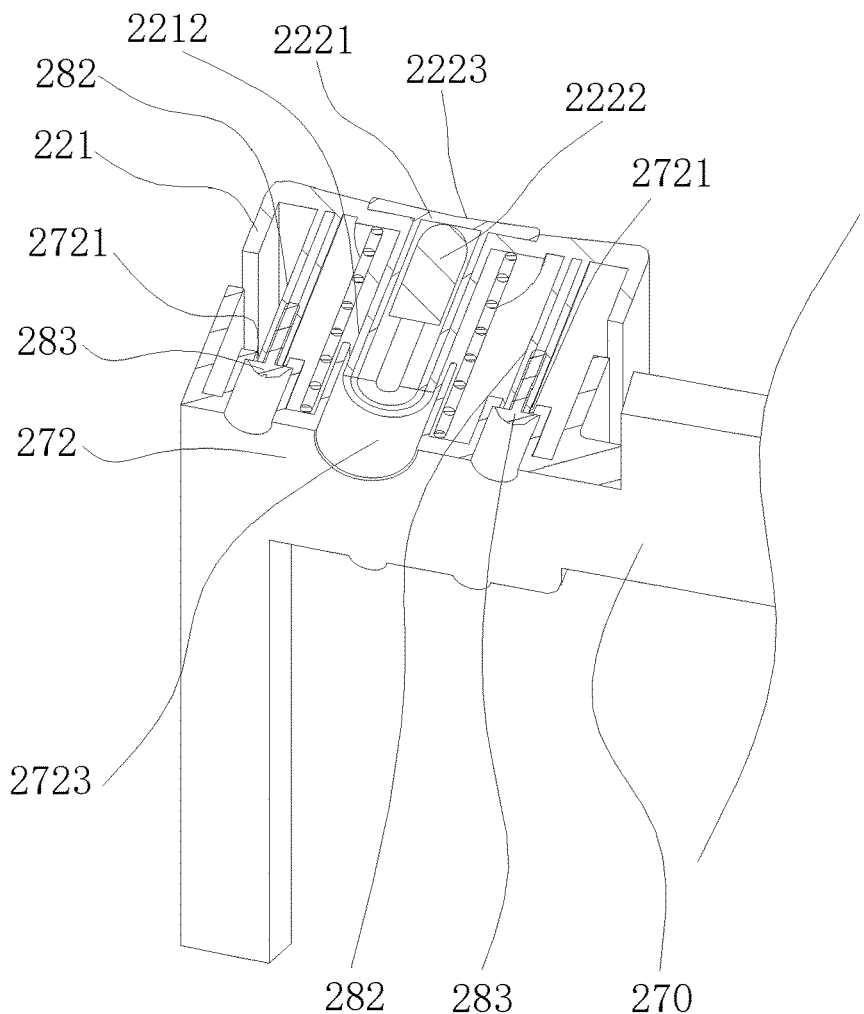
FIG. 11 is a perspective sectional view along C-C in FIG. 10.
Figure 12:
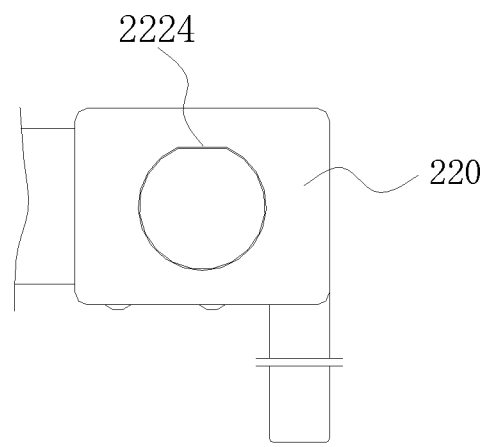
FIG. 12 is an F-view of FIG. 10.
Figure 13:
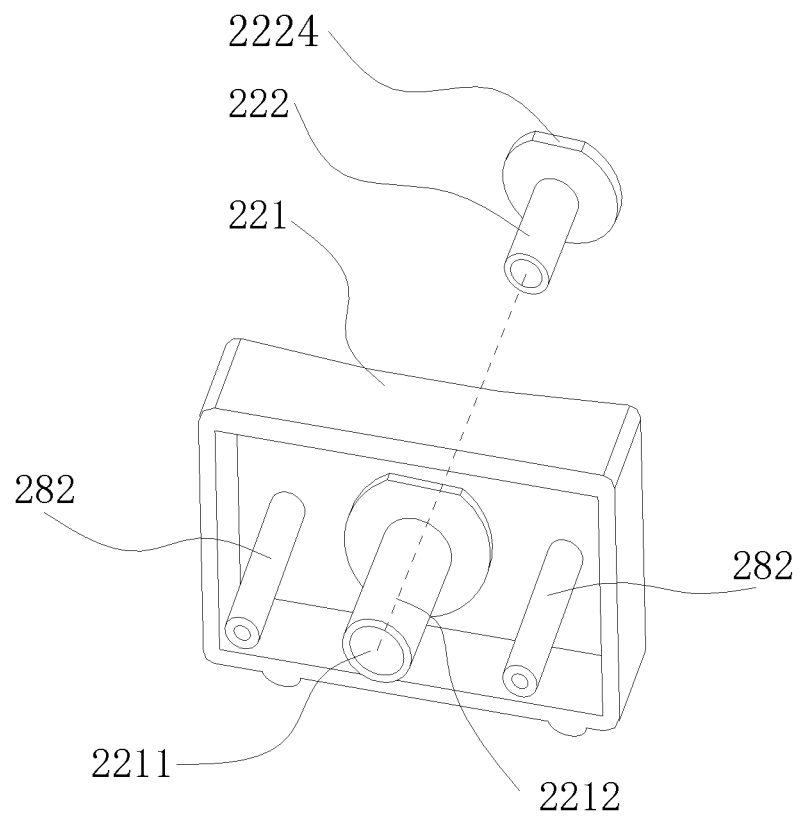
FIG. 13 is an exploded view of a mounting base and a thermostat in Embodiment 1 of the present invention.

As shown in FIG. 11, in some embodiments, the first stops 283 are screws and each comprise a first nut and a first threaded rod which are connected to each other, ends, away from the first nuts, of the first threaded rods are connected into the inner holes in the end faces of the first guide pillars 282 through threads, and the first nuts and the temperature measurement assembly 220 are located on different sides of the second end 272. The first nuts may abut against the first guide through holes 2721 in the second end 272 to limit the relative movement distance between the temperature measurement assembly 220 and the second end 272.

Figure 9:
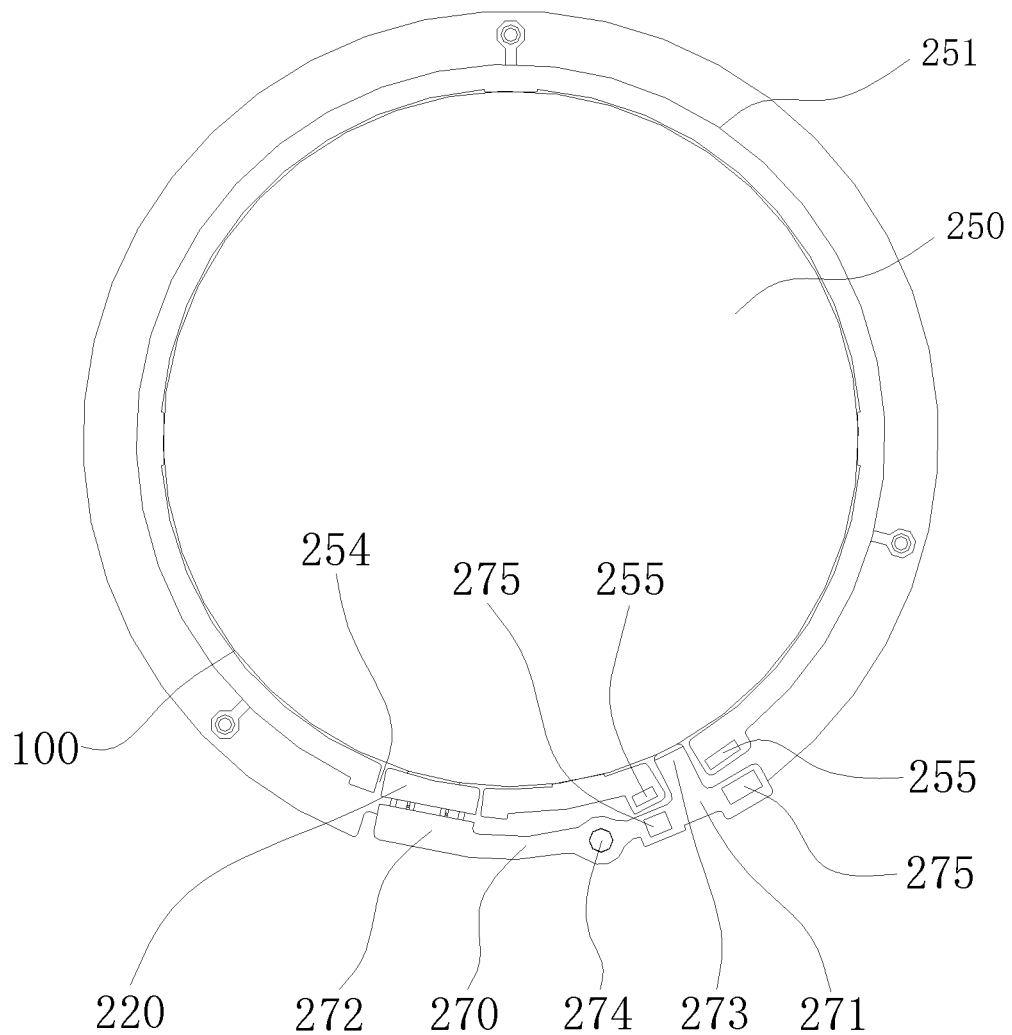
FIG. 9 is a top view of the milk beverage heating mixer with the cup being accommodated in the cavity in Embodiment 1 of the present invention.
Figure 10:
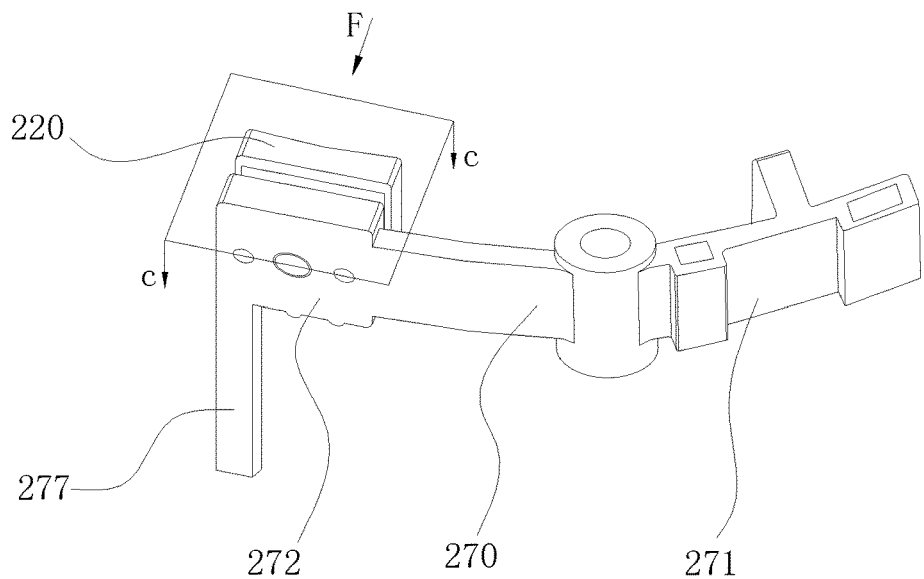
FIG. 10 is an assembled view of a first lever assembly and a temperature measurement assembly in Embodiment 1 of the present invention.

As shown in FIG. 9 and FIG. 11, a proper movement gap is reserved between the first guide through holes 2721 and the first guide pillars 282, and a proper movement gap is reserved between the connecting hole 2723 in the second end 272 and the outer cylinder 2212 of the mounting base 221; when the temperature measurement assembly 220 is close to the lower end of the cup 100 and the first elastic element 281 is compressed, the temperature measurement assembly 220 can be automatically adjusted to enable the temperature sensing surface 2223 thereof to better fit the arc surface of the lower end of the cup 100 for temperature measurement.

In some embodiments, as shown in FIG. 1 and FIG. 9, the process of temperature measurement of the temperature measurement assembly 220 and starting of the micro switch 240 is as follows: when the cup 100 is accommodated in the cavity 250, the side wall of the cup 100 presses the protrusion 273 at the first end 271 to enable the first level assembly 270 to rotate around the lever spindle 274, the second end 272 pushes the temperature measurement assembly 220 to stretch into the edge of the cavity 250 via the second radial opening 254 to make contact with the side wall of the cup 100 to measure the temperature of the cup 100, and at this moment, the start plate 277 presses a shrapnel of the micro switch 240 to close the circuit. As can be seen from FIG. 9, after the cup 100 is accommodated in the cavity 250, the protrusion 273 at the first end 271 and the temperature measurement assembly 220 are attached to the side wall of the cup 100.

In some embodiments, as shown in FIG. 2 and FIG. 8, the process of returning the temperature measurement assembly 220 and turning off the micro switch 240 is as follows: when the cup 100 is removed from the cavity 250, the magnetic driving parts 255 at the first radial opening 253 magnetically attract the magnetic driven parts 275 at the first end 271 of the first lever assembly 270 to enable the first lever assembly 270 to rotate around the lever spindle 274 to return, at this moment, the protrusion 273 stretches into the cavity 250, the temperature measurement assembly 220 retreats from the edge of the cavity 250 to be located in the second radial opening 254, at the same time, the start plate 277 leaves the shrapnel of the micro switch 240, and the circuit is disconnected by the micro switch; wherein, the magnetic attraction between the magnetic driving parts 255 and the magnetic driven parts of the return assembly can be adjusted to ensure that the return assembly can reliably return by means of magnetic attraction and the cup 100 can be placed in the cavity 250 without an excessively large resistance.

It should be noted that, in other embodiments, a second elastic return element may be arranged to provide a force for the first lever assembly 270 to enable the second end 272 and the temperature measurement assembly 220 to leave the edge of the cavity 250 and enable the temperature measurement assembly 220 to leave the outer edge of the heating plate 210. In some embodiments, a blind hole exactly facing the center of the heating plate is concavely formed in the protrusion 273 of the first lever assembly 270 and is located on the outer side away from the heating plate 210, the bottom of the blind hole stretches into the protrusion 273, and an opening of the blind hole is located in a side, away from the heating plate 210, of the protrusion 273 of the first lever assembly 270; in addition, a baffle is convexly disposed on the periphery of the flange edge 2512, exactly faces the first radial opening 253 in the radial direction of the cavity wall 2511 and is away from the outer side of the outer edge of the heating plate, that is, in an assembled state, the baffle faces the blind hole of the protrusion 273 in the radial direction of the cavity wall 2511; the baffle is located behind the blind hole of the protrusion 273 of the first lever assembly 270, and the second elastic return element is disposed between the baffle and the blind hole; the second elastic return element may be a compression spring, two ends of the spring are a fifth end and a sixth end respectively, the fifth end stretches into the blind hole and abuts against the bottom of the blind hole, the sixth end abuts against the baffle, and the second elastic return element may also be other elastic elements; when the cup 100 leaves the heating plate 210, the first lever assembly 270 returns under the elastic effect of the second elastic return element, the protrusion 273 stretches into the cavity 250 via the first radial opening 253, at this moment, the temperature measurement assembly 220 retreats away from the outer edge of the heating plate 210 to be located in the second radial opening 254, and thus, the temperature measurement assembly 220 will not be directly heated by waste heat of the heating plate 210.

According to the milk beverage heating mixer provided by this embodiment, the side wall of the cup pushes the first lever assembly to rotate, and then the first lever assembly pushes the temperature measurement assembly to make contact with the side wall of the cup to measure the temperature of the cup; when the cup leaves the cavity, the return assembly enables the temperature measurement assembly to leave the edge of the cavity to return into the second radial opening, so that the temperature measurement assembly will not be heated by waste heat of the heating plate; in one aspect, the temperature measurement assembly does not make contact with the heating plate and thus will not be directly heated by the waste heat of the heating plate, so that the influence of the heat of the heating plate on temperature measurement of the temperature measurement assembly can be reduced, the temperature measurement accuracy can be improved, and especially, the temperature measurement accuracy during continuous heating is improved to keep milk at a proper preset foaming temperature, the milk can be stirred more sufficiently, so that the fineness of milk foam is improved, and the taste and user experience are improved; in another aspect, it is unnecessary to form through holes, allowing the temperature measurement assembly and a start lever of the micro switch to pass through, in the heating plate or form a through hole in the center of the heating plate, so that the integrity of the heating plate remains good, the heating efficiency is improved, and the potential safety hazard of water leakage via the through holes is avoided; moreover, the temperature measurement assembly is pushed by the lever assembly to measure the temperature, so that the structure is simple, fabrication is convenient, assembly is easy, production costs are low, good contact between the temperature measurement assembly and the side wall of the cup is maintained, and reliable temperature measurement is guaranteed.

Embodiment 2

This embodiment is identical in principle and basically identical in structure with Embodiment 1 and different from Embodiment 1 in the connection manner between the second end 272 of the first lever assembly 270 and the temperature measurement assembly 220.

Figure 14:
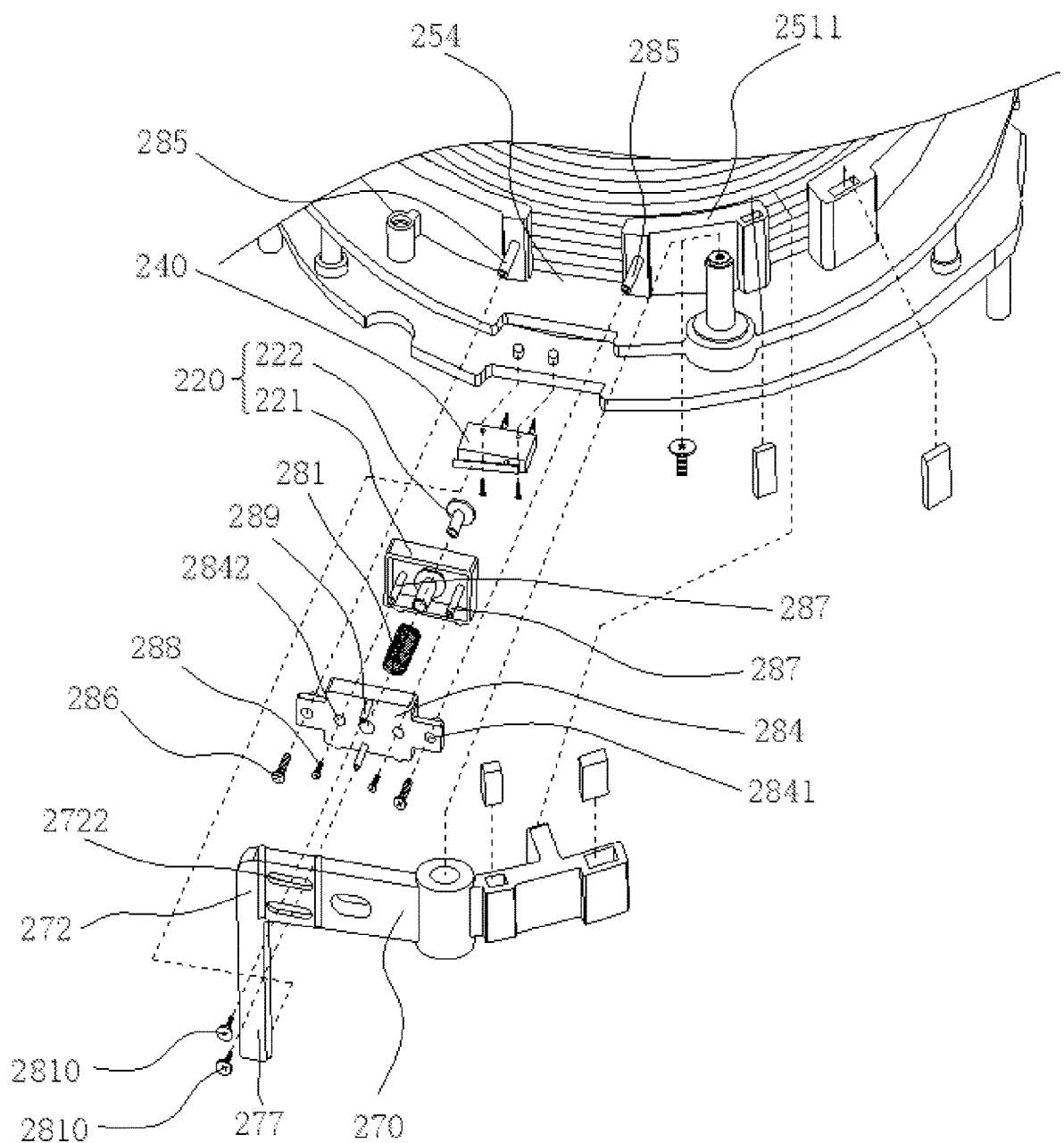
FIG. 14 is an exploded view of part of structural members in the base in Embodiment 2 of the present invention.

As shown in FIG. 14, in this embodiment, a connecting plate 284 is disposed between the temperature measurement assembly 220 and the second end 272, second guide pillars 285 are disposed on the cavity wall 2511 on two sides of the second radial opening 254, the connecting plate 284 is movably guided and connected to the second guide pillars 285 through second guide through holes 2841, two ends of each second guide pillar 285 are connected to the cavity wall 2511 and a second stop 286 respectively, and the second stops 286 are used to prevent the connecting plate 284 from being separated from the cavity wall 2511; the connecting plate 284 is movably guided and connected to the temperature measurement assembly 220 through third guide pillars 287, the third guide pillars 287 penetrate through third guide through holes 2842 in the connecting plate 284, two ends of each third guide pillar 287 are connected to the temperature measurement assembly 220 and a third stop 288 respectively, the third stops 288 are used to prevent the connecting plate 284 from being separated from the temperature measurement assembly 220, and the first elastic element 281 is disposed between the connecting plate 284 and the temperature measurement assembly 220.

The second end 272 is movably connected to the connecting plate 284 through connecting pillars 289, strip holes 2722 in sliding fit with the connecting pillars 289 are formed in the second end 272, the connecting pillars 289 penetrate through the strip holes 2722, and two ends of each connecting pillar 289 are connected to the connecting plate 284 and a connecting piece 2810 respectively, and it can be understood that the strip holes 2722 should be formed horizontally to ensure that the second end 272 can rotate with respect to the connecting pillars 289; to facilitate installation, the second stops 286, the third stops 288 and the connecting pieces 2810 are all screws, and inner holes to be connected with the second stops 286, the third stops 288 and the connecting pieces 2810 are formed in the second guide pillars 285, the third guide pillars 287 and the connecting pillars 289, respectively. To guarantee the movement stability, the number of the second guide pillars 285, the number of the third guide pillars 287 and the number of the connecting pillars 289 are at least two. By such a connection manner of the second end 272 and the temperature measurement assembly 220, the temperature measurement assembly 220 can move linearly with respect to the cavity 250 to make contact with the side wall of the cup 100 to measure the temperature of the cup 100. In this embodiment, the process of temperature measurement of the temperature measurement assembly 220 and returning of the first lever assembly 270 and the temperature measurement assembly is the same as that in Embodiment 1, and will no longer be detailed here.

As shown in FIG. 14, in some embodiments, the second stops 286 are screws and each comprise a second nut and a second threaded rod which are connected to each other, wherein ends, away from the second nuts, of the second threaded rods are connected into inner holes in end faces of the second guide pillars 285 through threads, and the second nuts and the cavity wall 2511 are located on different sides of the connecting plate 284. The second nuts may abut against the second guide through holes 2841 of the connecting plate 284 to limit the relative movement distance between the connecting plate 284 and the cavity wall 2511.

As shown in FIG. 14, in some embodiments, the third stops 288 are screws and each comprise a third nut and a third threaded rod which are connected to each other, wherein ends, away from the third nuts, of the third threaded rods are connected into inner holes in end faces of the third guide pillars 287, and the third nuts and the temperature measurement assembly 220 are located on different sides of the connecting plate 284. The third nuts may abut against the third guide through holes 2842 of the connecting plate 284 to limit the relative movement distance between the connecting plate 284 and the temperature measurement assembly 220.

As shown in FIG. 14, in some embodiments, the connecting pieces 2810 are screws and each comprise a fourth nut and a fourth threaded rod which are connected to each other, wherein ends, away from the fourth nuts, of the fourth threaded rods are connected into inner holes in end faces of the connecting pillars 289, and the fourth nuts and the connecting plate 284 are located on different sides of the second end 272. The fourth nuts may abut against the strip holes 2722 in the second end 272 to limit the relative movement distance between the connecting plate 284 and the second end 272.

It should be noted that, in other embodiments, the temperature measurement assembly 220 may be movably connected to the cavity wall 2511 or the base 200. For example, the temperature measurement assembly 220 is movably connected to the cavity wall 2511 through a second elastic element, and the second end 272 pushes the temperature measurement assembly 220 to overcome the elastic force of the second elastic element to make contact with the side wall of the cup 100 to measure the temperature of the cup 100.

The micro switch 240 in this embodiment is turned on or off in the same manner as Embodiment 1, and will no longer be detailed here.

Embodiment 3

This embodiment is identical in principle and basically identical in structure with Embodiments 1 and 2 and different from Embodiments 1 and 2 in that a third radial opening 258 is formed in the cavity wall 2511 of the cavity 250 and the micro switch 240 is turned on or off by means of a start element disposed at the third radial opening 258, and a first elastic return element 291.

Figure 16:
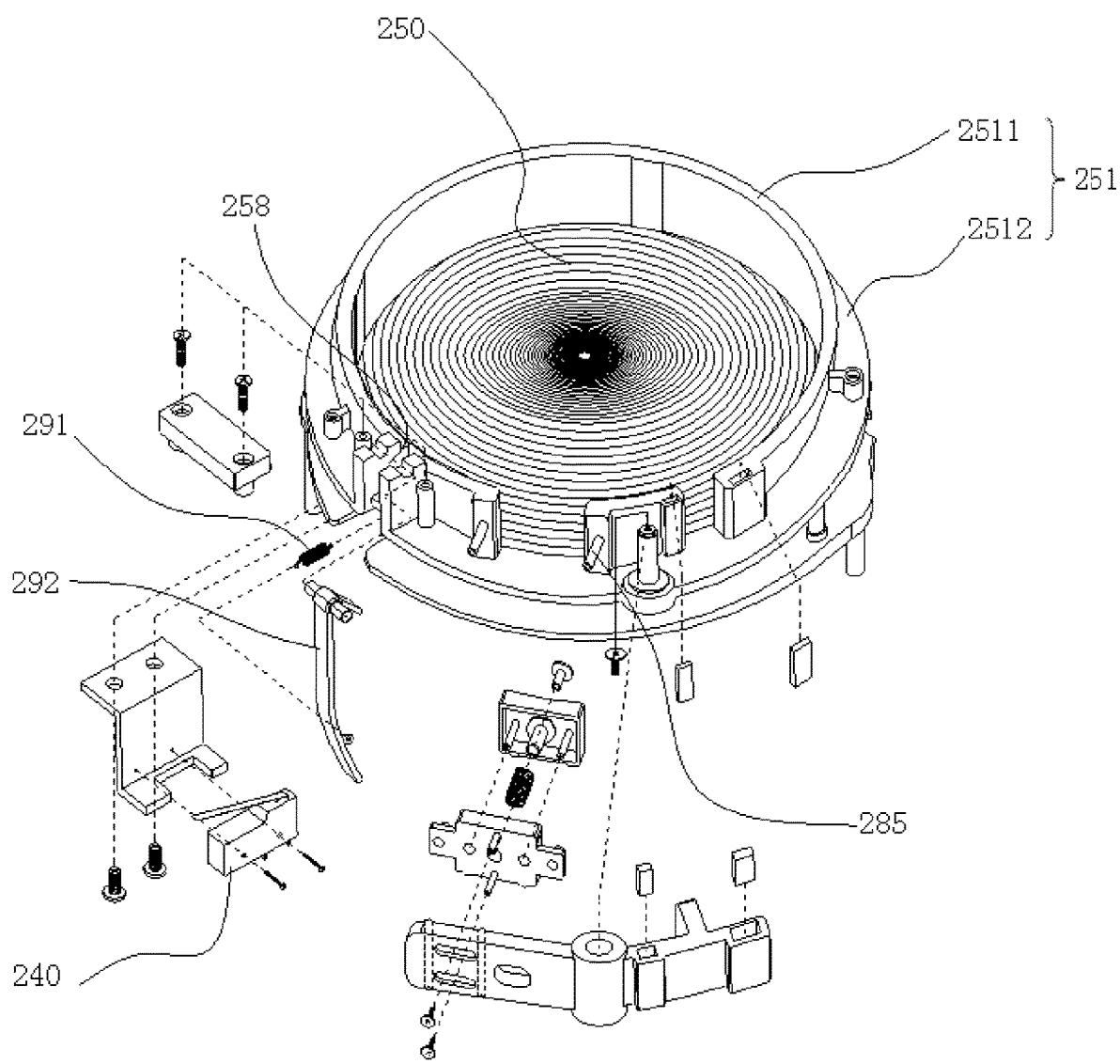
FIG. 16 is an exploded view of part of structural members in the base in Embodiment 3 of the present invention.

In some embodiments, as shown in FIG. 16, the third opening 258 is an opening penetrating through the cavity wall 2511 in the radial direction of the cavity wall 2511.

Figure 15:
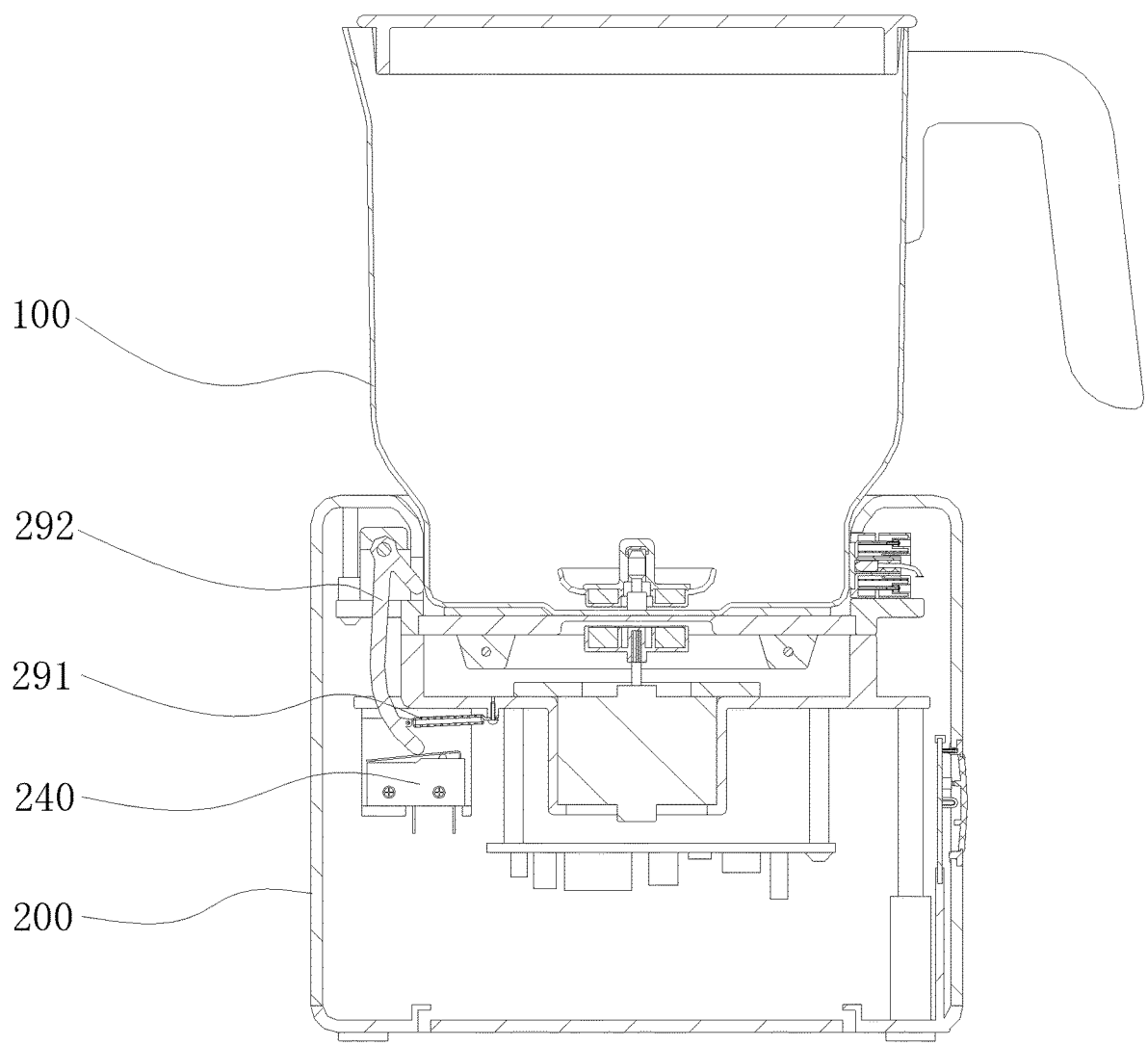
FIG. 15 is a sectional structural view of a micro switch started in another way of the milk beverage heating mixer in Embodiment 3 of the present invention.

As shown in FIG. 15 and FIG. 16, the start element comprises a second lever assembly 292 rotatably connected to the outer side of the cavity wall 2511, two ends of the second lever assembly 292 are a first start end to be in contact with the cup 100 and a first press end for pressing the micro switch 240, respectively. The third radial opening 258, allowing the first start end of the second lever assembly 292 to penetrate through, is formed in the cavity wall 2511 of the cavity 250. When the cup 100 is accommodated in the cavity 250, the side wall of the cup 100 pushes the first start end of the second lever assembly to enable the first press end of the second lever assembly 292 to press and start the micro switch 240, and the first elastic return element 291 provides a force to enable the first press end of the second lever assembly 292 to leave the micro switch 240. In this embodiment, the first start end comprises a second guide slope, and the upper end of the second guide slope inclines outwards with respect to the lower end of the second guide slope. The second guide slope of the first start end drives the second lever assembly 292 to rotate when pressed by the cup 100 to rotate outwards, and then the first press end presses the shrapnel of the micro switch 240 to turn on the power.

The temperature measurement and return process in this embodiment is the same as that in Embodiment 2, and will no longer be detailed here.

Embodiment 4

This embodiment is identical in principle and basically identical in structure with Embodiment 3 and different from Embodiment 3 in that the start element comprises a press lever 293 capable of sliding vertically.

Figure 17:
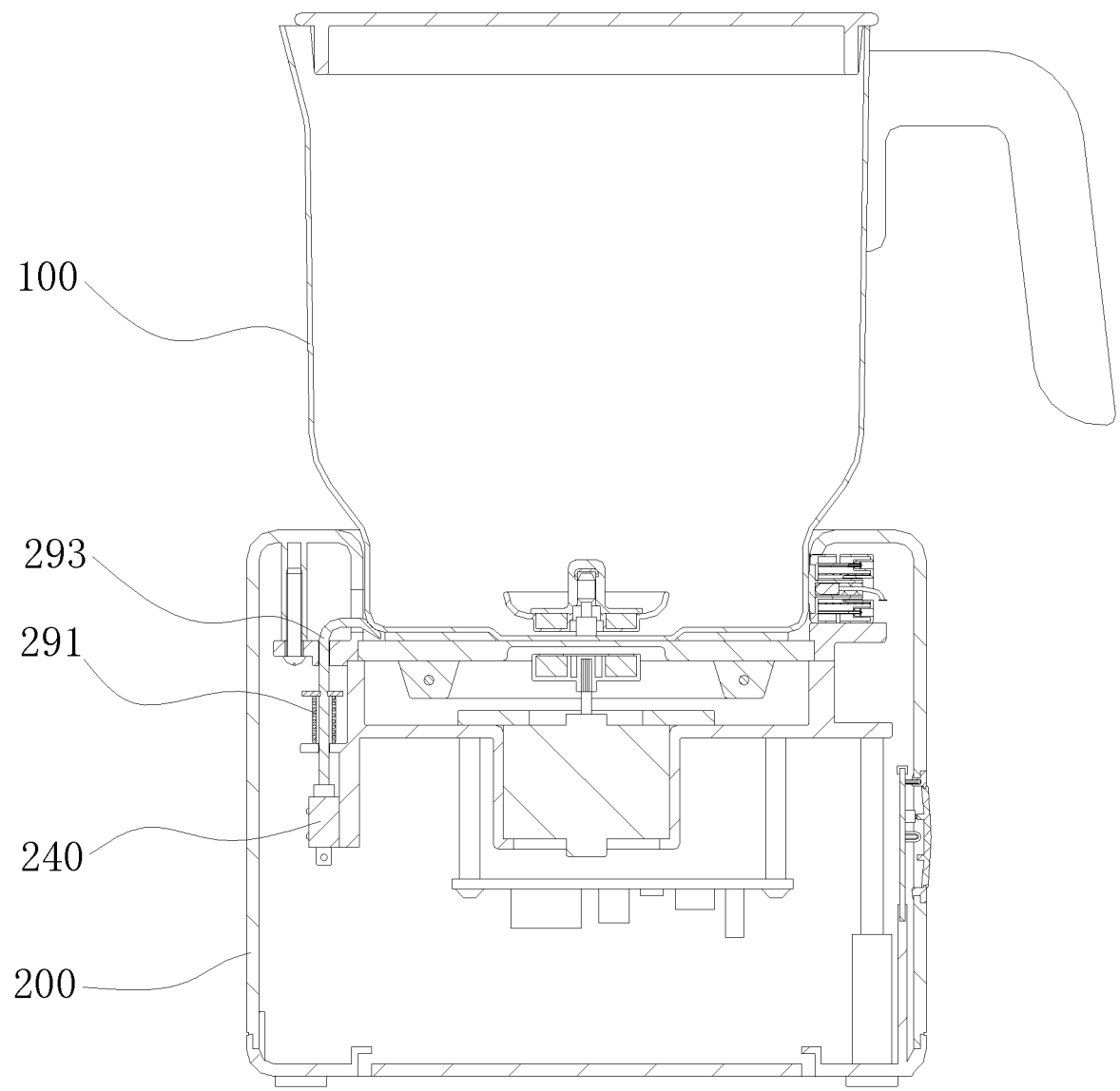
FIG. 17 is a sectional view of a micro switch started in another way of the milk beverage heating mixer in Embodiment 4 of the present invention.

As shown in FIG. 17, the structure and on-off of the start element are as follows: the start element comprises the press lever 293 disposed in the base 200 in a vertically sliding manner and the first elastic return element 291 for providing a return force for the press lever 293, and two ends of the press lever 293 are a second start end to be in contact with the bottom of the cup 100 and a second press end to be in contact with the micro switch 240 respectively. Optionally, the press lever 293 is approximately L-shaped. In some embodiments, a surface, to be in contact with the cup 100, of the second start end is a third guide slope, the upper end of the third guide slope inclines outwards with respect to the lower end of the third guide slope, and the third guide slope of the second start end drives the press lever 293 to slide downwards to press the shrapnel of the micro switch 240 to turn on the power when pressed by the cup 100.

According to the milk beverage heating mixer provided by the application, the side wall of the cup pushes the first lever assembly to rotate, and then the first lever assembly pushes the temperature measurement assembly to make contact with the side wall of the cup to measure the temperature of the cup; when the cup leaves the cavity, the return assembly enables the temperature measurement assembly to leave the edge of the cavity to return into the second radial opening, so that the temperature measurement assembly will not be heated by waste heat of the heating plate; in one aspect, the temperature measurement assembly does not make contact with the heating plate and thus will not be directly heated by the waste heat of the heating plate, so that the influence of the heat of the heating plate on temperature measurement of the temperature measurement assembly can be reduced, the temperature measurement accuracy can be improved, and especially, the temperature measurement accuracy during continuous heating is improved to keep milk at a proper preset foaming temperature, the milk can be stirred more sufficiently, so that the fineness of milk foam is improved, and the taste and user experience are improved; in another aspect, it is unnecessary to form through holes, allowing the temperature measurement assembly and a start lever of the micro switch to pass through, in the heating plate or form a through hole in the center of the heating plate, so that the integrity of the heating plate remains good, the heating efficiency is improved, and the potential safety hazard of water leakage via the through holes is avoided; moreover, the temperature measurement assembly is pushed by the lever assembly to measure the temperature, so that the structure is simple, fabrication is convenient, assembly is easy, production costs are low, good contact between the temperature measurement assembly and the side wall of the cup is maintained, and reliable temperature measurement is guaranteed.

What is claimed is:

1. A milk beverage heating mixer, comprising:
    a cup (100) for containing a milk beverage;
    a base (200) having an upper end formed with a cavity (250) for accommodating the cup (100), a first radial opening (253) and a second radial opening (254) being formed in a cavity wall (2511) of the cavity (250);
    a heating plate (210) disposed at a bottom of the cavity (250) and configured to heat a bottom of the cup (100);
    a temperature measurement assembly (220); and
    a first lever assembly (270) rotatably disposed outside the cavity (250), a protrusion (273) at a first end (271) of the first lever assembly (270) stretching into the cavity (250) via the first radial opening (253); when accommodated in the cavity (250), the cup (100) pressing the protrusion (273) and pushing the temperature measurement assembly (220) by means of a second end (272) of the first lever assembly (270) to stretch into the cavity (250) via the second radial opening (254) to make contact with a side wall of the cup (100).

2. The milk beverage heating mixer according to claim 1, further comprising a return assembly configured to provide a force for the first lever assembly (270) to enable the second end (272) and the temperature measurement assembly (220) to leave the cavity (250).

3. The milk beverage heating mixer according to claim 2, wherein,
    the return assembly comprises:
    a magnetic driving part (255) disposed at the first radial opening (253); and
    a magnetic driven part (275) disposed at the first end (271) and magnetically attracted by the magnetic driving part (255).

4. The milk beverage heating mixer according claim 1, wherein the temperature measurement assembly (220) is connected to the second end (272), and the second end (272) pushes the temperature measurement assembly (220) by means of a first elastic element (281) to make contact with the side wall of the cup (100).

5. The milk beverage heating mixer according to claim 4, wherein the second end (272) is movably connected to the temperature measurement assembly (220) through first guide pillars (282) which penetrate through first guide through holes (2721) in the second end (272), and two ends of each said first guide pillar (282) are connected to the temperature measurement assembly (220) and a first stop (283) respectively, and the first elastic element (281) is disposed between the second end (272) and the temperature measurement assembly (220); or,
    the milk beverage heating mixer further comprises a connecting plate (284) disposed between the temperature measurement assembly (220) and the second end (272), the cavity wall (2511) of the cavity (250) is movably connected to the connecting plate (284) through second guide pillars (285) which penetrate through second guide through holes (2841) in the connecting plate (284), and two ends of each said second guide pillar (285) are connected to the cavity wall (2511) and a second stop (286) respectively; the connecting plate (284) is movably connected to the temperature measurement assembly (220) through third guide pillars (287) which penetrate through third guide through holes (2842) in the connecting plate (284), two ends of each said third guide pillar (287) are connected to the temperature measurement assembly (220) and a third stop (288) respectively, and the first elastic element (281) is disposed between the connecting plate (284) and the temperature measurement assembly (220); and the second end (272) is movably connected to the connecting plate (284) through connecting pillars (289), and strip holes (2722) in sliding fit with the connecting pillars (289) are formed in the second end (272).

6. The milk beverage heating mixer according to claim 1, wherein a micro switch (240) is disposed in the base (200), a start plate (277) is disposed at the second end (272), and when the cup (100) is accommodated in the cavity (250), the start plate (277) presses and starts the micro switch (240).

7. The milk beverage heating mixer according to claim 1, wherein a micro switch (240), a start element and a first elastic return element (291) are disposed in the base (200), a third radial opening (258), allowing a third end of the start element to penetrate through, is formed in the cavity wall (2511) of the cavity (250), when accommodated in the cavity (250), the cup (100) pushes the third end of the start element to enable a fourth end of the start element to press and start the micro switch (240), and the first elastic return element (291) is configured to provide a force to enable the start element to leave the micro switch (240).

8. The milk beverage heating mixer according to claim 7, wherein the start element comprises a second lever assembly (292) connected into the base (200), and two ends of the second lever assembly (292) are a first start end to be in contact with the cup (100) and a first press end for pressing the micro switch (240); or,
    the start element comprises a press lever (293) disposed in the base (200) in a vertically sliding manner, and two ends of the press lever (293) are a second start end to be in contact with the bottom of the cup (100) and a second press end to be in contact with the micro switch (240).

9. The milk beverage heating mixer according to claim 1, wherein a magnetic stirrer (110) is rotatably disposed in the cup (100), a driving device (264) and a magnetic driving disk (265) connected to an output shaft of the driving device (264) are disposed in the base (200), and the driving device (264) is configured to drive the magnetic stirrer (110) to rotate by means of the magnetic driving disk (265).

10. The milk beverage heating mixer according to claim 9, wherein an isolation hood (160) is movably disposed on an inner bottom surface of the cup (100), covers a periphery of the magnetic stirrer (110) and is spaced apart from the magnetic stirrer (110), and at least one of a through groove and a through hole is formed in the isolation hood (160).

11. The milk beverage heating mixer according to claim 2, wherein the temperature measurement assembly (220) is connected to the second end (272), and the second end (272) pushes the temperature measurement assembly (220) by means of a first elastic element (281) to make contact with the side wall of the cup (100).

12. The milk beverage heating mixer according to claim 3, wherein the temperature measurement assembly (220) is connected to the second end (272), and the second end (272) pushes the temperature measurement assembly (220) by means of a first elastic element (281) to make contact with the side wall of the cup (100).

13. The milk beverage heating mixer according to claim 11, wherein the second end (272) is movably connected to the temperature measurement assembly (220) through first guide pillars (282) which penetrate through first guide through holes (2721) in the second end (272), and two ends of each said first guide pillar (282) are connected to the temperature measurement assembly (220) and a first stop (283) respectively, and the first elastic element (281) is disposed between the second end (272) and the temperature measurement assembly (220); or, the milk beverage heating mixer further comprises a connecting plate (284) disposed between the temperature measurement assembly (220) and the second end (272), the cavity wall (2511) of the cavity (250) is movably connected to the connecting plate (284) through second guide pillars (285) which penetrate through second guide through holes (2841) in the connecting plate (284), and two ends of each said second guide pillar (285) are connected to the cavity wall (2511) and a second stop (286) respectively; the connecting plate (284) is movably connected to the temperature measurement assembly (220) through third guide pillars (287) which penetrate through third guide through holes (2842) in the connecting plate (284), two ends of each said third guide pillar (287) are connected to the temperature measurement assembly (220) and a third stop (288) respectively, and the first elastic element (281) is disposed between the connecting plate (284) and the temperature measurement assembly (220); and the second end (272) is movably connected to the connecting plate (284) through connecting pillars (289), and strip holes (2722) in sliding fit with the connecting pillars (289) are formed in the second end (272).

14. The milk beverage heating mixer according to claim 12, wherein the second end (272) is movably connected to the temperature measurement assembly (220) through first guide pillars (282) which penetrate through first guide through holes (2721) in the second end (272), and two ends of each said first guide pillar (282) are connected to the temperature measurement assembly (220) and a first stop (283) respectively, and the first elastic element (281) is disposed between the second end (272) and the temperature measurement assembly (220); or, the milk beverage heating mixer further comprises a connecting plate (284) disposed between the temperature measurement assembly (220) and the second end (272), the cavity wall (2511) of the cavity (250) is movably connected to the connecting plate (284) through second guide pillars (285) which penetrate through second guide through holes (2841) in the connecting plate (284), and two ends of each said second guide pillar (285) are connected to the cavity wall (2511) and a second stop (286) respectively; the connecting plate (284) is movably connected to the temperature measurement assembly (220) through third guide pillars (287) which penetrate through third guide through holes (2842) in the connecting plate (284), two ends of each said third guide pillar (287) are connected to the temperature measurement assembly (220) and a third stop (288) respectively, and the first elastic element (281) is disposed between the connecting plate (284) and the temperature measurement assembly (220); and the second end (272) is movably connected to the connecting plate (284) through connecting pillars (289), and strip holes (2722) in sliding fit with the connecting pillars (289) are formed in the second end (272).

15. The milk beverage heating mixer according to claim 2, wherein a micro switch (240) is disposed in the base (200), a start plate (277) is disposed at the second end (272), and when the cup (100) is accommodated in the cavity (250), the start plate (277) presses and starts the micro switch (240).

16. The milk beverage heating mixer according to claim 3, wherein a micro switch (240) is disposed in the base (200), a start plate (277) is disposed at the second end (272), and when the cup (100) is accommodated in the cavity (250), the start plate (277) presses and starts the micro switch (240).

17. The milk beverage heating mixer according to claim 2, wherein a micro switch (240), a start element and a first elastic return element (291) are disposed in the base (200), a third radial opening (258), allowing a third end of the start element to penetrate through, is formed in the cavity wall (2511) of the cavity (250), when accommodated in the cavity (250), the cup (100) pushes the third end of the start element to enable a fourth end of the start element to press and start the micro switch (240), and the first elastic return element (291) is configured to provide a force to enable the start element to leave the micro switch (240).

18. The milk beverage heating mixer according to claim 3, wherein a micro switch (240), a start element and a first elastic return element (291) are disposed in the base (200), a third radial opening (258), allowing a third end of the start element to penetrate through, is formed in the cavity wall (2511) of the cavity (250), when accommodated in the cavity (250), the cup (100) pushes the third end of the start element to enable a fourth end of the start element to press and start the micro switch (240), and the first elastic return element (291) is configured to provide a force to enable the start element to leave the micro switch (240).

19. The milk beverage heating mixer according to claim 17, wherein the start element comprises a second lever assembly (292) connected into the base (200), and two ends of the second lever assembly (292) are a first start end to be in contact with the cup (100) and a first press end for pressing the micro switch (240); or, the start element comprises a press lever (293) disposed in the base (200) in a vertically sliding manner, and two ends of the press lever (293) are a second start end to be in contact with the bottom of the cup (100) and a second press end to be in contact with the micro switch (240).

20. The milk beverage heating mixer according to claim 18, wherein the start element comprises a second lever assembly (292) connected into the base (200), and two ends of the second lever assembly (292) are a first start end to be in contact with the cup (100) and a first press end for pressing the micro switch (240); or, the start element comprises a press lever (293) disposed in the base (200) in a vertically sliding manner, and two ends of the press lever (293) are a second start end to be in contact with the bottom of the cup (100) and a second press end to be in contact with the micro switch (240).

21. The milk beverage heating mixer according to claim 2, wherein a magnetic stirrer (110) is rotatably disposed in the cup (100), a driving device (264) and a magnetic driving disk (265) connected to an output shaft of the driving device (264) are disposed in the base (200), and the driving device (264) is configured to drive the magnetic stirrer (110) to rotate by means of the magnetic driving disk (265).

22. The milk beverage heating mixer according to claim 3, wherein a magnetic stirrer (110) is rotatably disposed in the cup (100), a driving device (264) and a magnetic driving disk (265) connected to an output shaft of the driving device (264) are disposed in the base (200), and the driving device (264) is configured to drive the magnetic stirrer (110) to rotate by means of the magnetic driving disk (265).

23. The milk beverage heating mixer according to claim 21, wherein an isolation hood (160) is movably disposed on an inner bottom surface of the cup (100), covers a periphery of the magnetic stirrer (110) and is spaced apart from the magnetic stirrer (110), and at least one of a through groove and a through hole is formed in the isolation hood (160).

24. The milk beverage heating mixer according to claim 22, wherein an isolation hood (160) is movably disposed on an inner bottom surface of the cup (100), covers a periphery of the magnetic stirrer (110) and is spaced apart from the magnetic stirrer (110), and at least one of a through groove and a through hole is formed in the isolation hood (160).

\* \* \* \* \*